United States Patent
Zhu et al.

(10) Patent No.: US 12,304,993 B2
(45) Date of Patent: May 20, 2025

(54) STORAGE-STABLE POLYISOCYANATE COMPOSITION AND PREPARATION METHOD

(71) Applicants: WANHUA CHEMICAL GROUP CO., LTD., Shandong (CN); WANHUA CHEMICAL (NINGBO) CO., LTD., Zhejiang (CN)

(72) Inventors: Zhicheng Zhu, Shandong (CN); Bin Shi, Shandong (CN); Chengyue Yan, Shandong (CN); Bing Zheng, Shandong (CN); Li Li, Shandong (CN); Yonghua Shang, Shandong (CN); Wei Liu, Shandong (CN); Haijun Li, Shandong (CN); Nuancheng Wang, Shandong (CN); Yuan Li, Shandong (CN)

(73) Assignees: WANHUA CHEMICAL GROUP CO., LTD., Shandong (CN); WANHUA CHEMICAL (NINGBO) CO., LTD., Zhejiang (CN)

( * ) Notice: Subject to any disclaimer, the term of this patent is extended or adjusted under 35 U.S.C. 154(b) by 491 days.

(21) Appl. No.: 17/790,433

(22) PCT Filed: Jul. 22, 2020

(86) PCT No.: PCT/CN2020/103413
§ 371 (c)(1),
(2) Date: Dec. 12, 2022

(87) PCT Pub. No.: WO2021/135175
PCT Pub. Date: Jul. 8, 2021

(65) Prior Publication Data
US 2023/0132686 A1    May 4, 2023

(30) Foreign Application Priority Data

Jan. 2, 2020    (CN) ............................ 202010000495

(51) Int. Cl.
| | |
|---|---|
| *C08G 18/79* | (2006.01) |
| *C08G 18/16* | (2006.01) |
| *C08G 18/28* | (2006.01) |
| *C08G 18/32* | (2006.01) |
| *C08G 18/73* | (2006.01) |
| *C08G 18/80* | (2006.01) |
| *C09D 175/04* | (2006.01) |

(52) U.S. Cl.
CPC ......... *C08G 18/798* (2013.01); *C08G 18/168* (2013.01); *C08G 18/2815* (2013.01); *C08G 18/282* (2013.01); *C08G 18/3206* (2013.01); *C08G 18/73* (2013.01); *C08G 18/792* (2013.01); *C08G 18/8016* (2013.01); *C09D 175/04* (2013.01); *C08G 2150/00* (2013.01)

(58) Field of Classification Search
CPC .............. C08G 18/168; C08G 18/2815; C08G 18/282; C08G 18/8016; C08G 18/792; C08G 18/798
See application file for complete search history.

(56) References Cited

U.S. PATENT DOCUMENTS

| | | |
|---|---|---|
| 4,160,080 A | 7/1979 | Koenig et al. |
| 4,294,719 A | 10/1981 | Wagner et al. |
| 5,059,632 A | 10/1991 | Horn et al. |
| 5,358,997 A | 10/1994 | Rosthauser et al. |
| 5,859,163 A | 1/1999 | Slack et al. |
| 6,838,542 B1 | 1/2005 | Slack et al. |

FOREIGN PATENT DOCUMENTS

| | | |
|---|---|---|
| CN | 1334264 A | 2/2002 |
| CN | 1469889 A | 1/2004 |
| CN | 1688627 A | 10/2005 |
| CN | 1230457 C | 12/2005 |
| CN | 101291970 A | 10/2008 |
| CN | 102015814 A | 4/2011 |
| CN | 103201305 A | 7/2013 |
| CN | 107189039 A | 9/2017 |
| CN | 107406566 A | 11/2017 |

(Continued)

OTHER PUBLICATIONS

JP-2002226538_Hideyuki et al._Aug. 14, 2002.English Translation.*
Japanese Office Action issued for Application No. 2022-536899, mailed Jun. 12, 2023.
Daniel Da Silva et al, "Influence of the storage of reactive urethane quasi-prepolymers in their composition and adhesion properties," International Journal of Adhesion & Adhesives 2007, 28: 29-37.
Xiaobing et al., "Polyisocyanurate and Its Application" Polyurethane Industry, 2001, 16(2): 9-16.

*Primary Examiner* — Michael L Leonard
(74) *Attorney, Agent, or Firm* — Barnes & Thornburg LLP

(57) ABSTRACT

The present application provides a storage-stable polyisocyanate composition and a preparation method. The polyisocyanate composition is obtained by selecting one or more diisocyanate from aliphatic diisocyanates and alicyclic diisocyanates, and reacting same with an alcohol compound; the polyisocyanate composition contains an isocyanurate group, a uretdione group, a carbamate group, and an allophanate group; within the polyisocyanate composition, the molar ratio of the carbamate group/(uretdione group+isocyanurate group) is 0.01-0.2, and preferably 0.01-0.1. Compared to existing techniques, the present application has the advantage of a noticeable increase in system viscosity of uretdione polyisocyanate during storage. With the present application, by means of controlling the ratio of the carbamate group/(uretdione group+isocyanurate group) within the system, the increase in viscosity of a product during storage is inhibited, thereby improving the storage stability of the product.

19 Claims, No Drawings

(56) References Cited

FOREIGN PATENT DOCUMENTS

| | | | |
|---|---|---|---|
| CN | 107709389 A | 2/2018 | |
| CN | 107709397 A | 2/2018 | |
| CN | 109071769 A | 12/2018 | |
| CN | 109761903 A | 5/2019 | |
| CN | 110050008 A | 7/2019 | |
| CN | 110128624 A | 8/2019 | |
| CN | 110305294 A | 10/2019 | |
| CN | 110372846 A | 10/2019 | |
| CN | 110540633 A | 12/2019 | |
| CN | 111072917 A | 4/2020 | |
| DE | 1670720 A1 | 1/1971 | |
| EP | 0671426 A1 | 9/1995 | |
| EP | 0764633 A2 | 3/1997 | |
| EP | 0798299 A1 | 10/1997 | |
| JP | 2002226538 A * | 8/2002 | ............ C08G 18/10 |
| JP | 2003137966 A | 5/2003 | |
| JP | 2007112936 A | 5/2007 | |
| JP | 2017197657 A | 11/2017 | |
| WO | WO 2018/212334 A1 | 11/2018 | |

* cited by examiner

STORAGE-STABLE POLYISOCYANATE COMPOSITION AND PREPARATION METHOD

TECHNICAL FIELD

The present application relates to a polyisocyanate composition, such as a storage-stable polyisocyanate composition and a preparation method, belonging to the technical field of isocyanate derivatives.

BACKGROUND

Isocyanate homopolymers containing uretdione groups have a very low viscosity at the beginning of preparation. Therefore, when used as a cross-linking agent component in a water-based, low-solvent, high-solid-content coating composition, the isocyanate homopolymer has relatively good performance, and it is especially widely used as a diluent of a curing agent replacing a solvent.

At present, methods of preparing polyisocyanates containing uretdione groups from aliphatic and alicyclic diisocyanates in the presence of catalysts are known. The advantages and disadvantages of various dimerization catalysts or catalyst systems have been discussed in detail in the literatures (e.g. the published literature Zur Synthese aliphatischer Polyisocyanate-Lackpolyisocyanate mit Biuret-, Isocyanurat-oder Uretdionstruktur, J. Prakt. Chem., vol. 336, pp. 185-200 (1994), and the published patents U.S. Pat. Nos. 5,919,887A, 5,449,775A, 8,039,574B2, U.S. Pat. Nos. 5,502,149A, 5,354,834A, 4,994,541A, CN1334264A, CN1511858A and U.S. Pat. No. 3,919,195A).

CN1511858A discloses a technical solution for obtaining a polyisocyanate reaction liquid containing uretdione by using a cycloalkyl phosphine catalysis and performing a reaction at less than or equal to 40° C. In this solution, no terminator is added after the reaction, and a two-stage evaporator is used to remove the unreacted isocyanate monomers and catalyst directly, thereby preparing the polyisocyanate containing uretdione groups. In the process of removing unreacted monomers, due to the presence of the catalyst, the reaction liquid is unstable, the polymer content is high, and the catalyst is difficult to remove completely, resulting in poor product storage stability and rapid viscosity increase, which cannot satisfy the requirements of quality guarantee period of the products in downstream applications.

CN1334264A discloses a method of improving the storage stability of uretdione polyisocyanate. The method adopts "adding substituted urea or substituted amide in the reaction process" to improve the storage stability of the product and inhibit the increase of isocyanate monomers. However, there still appear other problems during storage, such as a rapid increase of the product viscosity.

CN101289427A discloses a method for the dimerization of isocyanates (to form uretdiones) using a specific phosphine as a catalyst. The method uses the phosphine having one or two tertiary alkyl directly bonded to phosphorus as the catalyst, and the obtained product has a low initial viscosity, but the viscosity similarly increases significantly during prolonged storage.

Therefore, the uretdione polyisocyanate prepared by the existing process has main disadvantages that the product has poor storage stability, and the product viscosity increases rapidly, which cannot satisfy the requirements of downstream applications.

SUMMARY

The following is a summary of the subject specifically described in the present disclosure. This summary is not intended to limit the protection scope of the claims.

An object of the present application is to provide a storage-stable polyisocyanate composition and a preparation method. By controlling a molar ratio of a carbamate group to a sum of a uretdione group and a isocyanurate group within a specific range in the polyisocyanate system containing the uretdione group, the obtained product can possess better performance than those obtained from the prior art. The polyisocyanate composition prepared by the method has a product viscosity hardly increased during long-term storage, satisfying the requirements of downstream applications.

To achieve the above object, the technical solution adopted in the present application is as follows:

A storage-stable polyisocyanate composition is obtained by reacting one or more diisocyanates, which is selected from aliphatic diisocyanates and alicyclic diisocyanates, with an alcohol compound, and the polyisocyanate composition includes an isocyanurate group, a uretdione group, a carbamate group and an allophanate group;

in the polyisocyanate composition, a molar ratio of the carbamate group/(the uretdione group+the isocyanurate group) is 0.01-0.2, preferably 0.01-0.1.

In an embodiment of the present application, a polyisocyanate composition provided includes a carbamate group represented by the formula (I), a uretdione group represented by the formula (II), and an isocyanurate group represented by the formula (III):

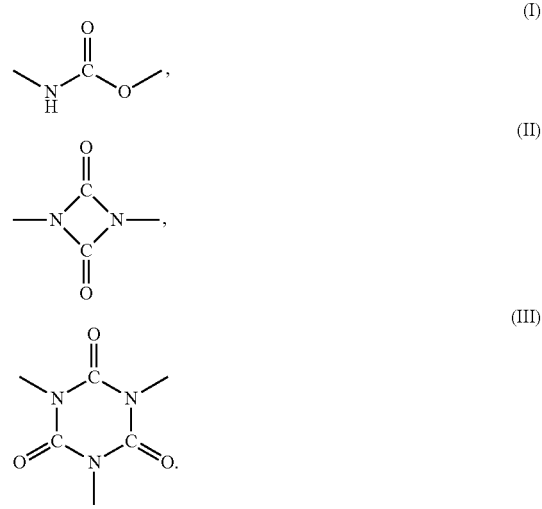

A content ratio of the carbamate group to the uretdione group and the isocyanurate group is based on the molar ratio of the carbamate group/(the uretdione group and the isocyanurate group), and is more than or equal to 0.01 and less than or equal to 0.2. When the molar ratio is more than or equal to 0.01, the content of uretdione and trimer in the product is high, and the viscosity is low. Additionally, when the molar ratio is less than or equal to 0.2, preferably less than or equal to 0.1, the product has good storage stability and will not precipitate white substances during storage.

The molar ratio can be determined by $^{13}$C-NMR. The determination method includes that determining a signal area (C1) at around 156 ppm assigned to the carbon atom of the carbonyl group of the carbamate group, determining a signal area (C2) at around 149 ppm assigned to the carbon atom of the carbonyl group of the isocyanurate group and a signal area (C3) at around 158 ppm assigned to the carbon atom of the uretdione group, and calculating the measured value according to the molar ratio formula.

Furthermore, in the polyisocyanate composition, a molar ratio of the carbamate group/(the allophanate group+the carbamate group) is 0.01-0.4, preferably 0.01-0.3.

In an embodiment of the present application, a polyisocyanate composition includes an allophanate group represented by the formula (IV):

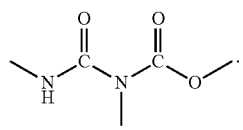

(IV)

A content ratio of the carbamate group to the allophanate group and the carbamate group is based on the molar ratio of the carbamate group/(the allophanate group and the carbamate group), and is more than or equal to 0.01 and less than or equal to 0.4. When the molar ratio is less than or equal to 0.4, preferably less than or equal to 0.3, the product has better curing performance, and when the molar ratio is more than 0.01, the product has better storage stability.

The carbamate group is formed from a diisocyanate group and an alcoholic hydroxyl group, and the allophanate group is formed from the carbamate group and an isocyanate group, which means that the molar ratio of the carbamate group/(the allophanate group+the carbamate group) is an index indicating the ratio in which the hydroxyl structure of the diol has not been converted into the allophanate group. When the hydroxyl structure of the alcohol is completely converted into allophanate, the molar ratio is 0.

The molar ratio of the allophanate group and the carbamate group can be determined by $^1$H-NMR. The determination method includes that determining a signal area (H1) at around 8.50 ppm assigned to the hydrogen atom bonded to the nitrogen of the allophanate group and a signal area (H2) at around 4.90 ppm assigned to the hydrogen atom bonded to the nitrogen of the carbamate group, and calculating the measured value according to the molar ratio formula.

Since the material used in the reaction is diisocyanate, the system contains a large number of NCO groups, and the product separated after the reaction is still a polyisocyanate composition, and still contains active NCO groups. Furthermore, in the polyisocyanate composition, an isocyanate group concentration (an NCO group content) is 16-24% by weight, preferably 20-23% by weight. A polyisocyanate composition in an embodiment of the present application has an isocyanate group concentration of more than or equal to 16% by weight, preferably more than or equal to 20% by weight. When the isocyanate group concentration is more than or equal to 16% by weight, there is a tendency that the polyisocyanate composition exhibits a viscosity that is easier to handle. Additionally, when a polyisocyanate composition in an embodiment of the present application has an isocyanate group concentration of less than or equal to 24% by weight, preferably less than or equal to 23% by weight, there is a tendency that the curing property of the coating composition is better. The isocyanate group concentration can be determined based on the method described in an example described hereinafter.

In an embodiment of the present application, the viscosity of a polyisocyanate composition is determined by using a BrookField DV-1 Prime viscometer. The viscosity is preferably 100-1500 cp/25° C., more preferably 130-1000 cp/25° C. When the polyisocyanate composition is within this range, the material is easier to process.

Furthermore, the alcohol compound especially includes a monovalent or polyvalent aliphatic alcohol with a low molecular weight, preferably an alcohol compound with a relative molecular weight of 32-200; more preferably, the alcohol compound is one or more of methanol, ethanol, n-propanol, isopropanol, n-butanol, n-hexanol, 2-ethyl-1-hexanol, 1-methoxy-2-propanol, ethylene glycol, propylene glycol, isomeric butanediol, hexylene glycols, caprylyl glycols, diethylene glycol, dipropylene glycol, 2-ethyl-1,3-hexanediol, 2,2,4-trimethylpentanediol, glycerol and trimethylolpropane.

Furthermore, the aliphatic diisocyanate and the alicyclic diisocyanate are an organic diisocyanate containing 4-20 carbon atoms in the carbon skeleton in addition to the NCO group Furthermore, the organic diisocyanate is one or more of hexamethylene diisocyanate (HDI), isophorone diisocyanate (IPDI), cyclohexyl dimethylene diisocyanate (HMDI), dicyclohexylmethane diisocyanate (HXDI), norbornane dimethylene diisocyanate (NBDI), cyclohexyl diisocyanate (CHDI) and 2,4,4-trimethylhexamethylene diisocyanate (TMHDI).

Furthermore, after the polyisocyanate composition has been stored at less than or equal to 40° C. for 6 months, the product viscosity changes less than or equal to 10%.

An example of a preparation method of the polyisocyanate composition in the present application is illustrated below, but not limited to the following:

a preparation method of the storage-stable polyisocyanate composition specifically includes: mixing and reacting the diisocyanate and the alcohol compound, and controlling a reaction temperature to be 50-160° C., preferably 50-150° C., and more preferably 50-120° C., under which the carbamate-forming reaction is easier to perform; controlling a reaction time to be 0.5-4 hours, preferably 1 hour, during which the formed carbamate can be converted to allophanate; then adding a tertiary phosphine catalyst, and controlling a reaction temperature to be 60-120° C., preferably 60-100° C., and a reaction time to be 1-12 hours, preferably 1-8 hours, and more preferably 1-5 hours. Additionally, the alcohol compound can also be added after the uretdione-containing reaction liquid generated, which means a preparation method includes that: mixing and reacting the diisocyanate and a tertiary phosphine catalyst firstly, and controlling a reaction temperature to be 50-150° C., preferably 50-80° C.; controlling a reaction time to be 0.5-12 hours, preferably 1-10 hours; then adding the alcohol compound, and controlling a reaction temperature to be 60-120° C., preferably 80-100° C., and a reaction time to be 1-3 hours, preferably 1-2 hours. The uretdione and the isocyanurate are derived from the diisocyanate that is subjected to dimerization and trimerization under the effect of the tertiary phosphine catalyst.

A concentration of the alcohol compound is not particularly limited in an embodiment of the present application, but is preferably 0.5-3% by weight relative to the polyisocyanate component.

Furthermore, the tertiary phosphine catalyst has the following structural formula:

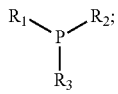

wherein, $R_1$, $R_2$ and $R_3$ are independently selected from an aliphatic substituent or an aromatic substituent. In some specific embodiments, the aliphatic substituent is selected from linear alkyl, branched alkyl or cycloalkyl; the aromatic substituent is a C7-10 aromatic substituent; the aliphatic substituent preferably is a C1-10 linear alkyl group, a C3-10 branched alkyl group, and a C3-10 cycloalkyl group; the aromatic substituent is preferably benzyl. In some preferred embodiments, the tertiary phosphine catalyst is selected from trimethyl phosphine, triethyl phosphine, tripropyl phosphine, triisopropyl phosphine, tri-n-butylphosphine, tri-tert-butylphosphine, dicyclopentyl butylphosphine, tripentylphosphine, tricyclopentylphos phine, trihexylphosphine, triphenylphosphine, tribenzylphosphine, benzyldimethylphosphine, tricyclohexylphosphine, tri-n-octylphosphine, and the like, and more preferably, the catalyst is tri-tert-butylphosphine and/or trioctylphosphine.

In a method in an embodiment of the present application, when a ratio of the consumed mass of isocyanate in the system to the total mass of isocyanate monomer in the system reaches 10-80%, preferably 30-70%, a terminator is added to terminate the reaction. When the conversion rate in the system is lower, the carbamate content in the system is higher. The content of carbamate in the system is controlled by controlling the conversion rate..

The terminator used may be one or more of acyl chlorides (such as formyl chloride, acetyl chloride, benzoyl chloride or benzenedicarboxylic acid chloride, and the like), sulfonates (such as methyl toluenesulfonate, ethyl toluenesulfonate, and the like), alkyl phosphates (such as monobutyl phosphate, dibutyl phosphate, monoethyl phosphate, diethyl phosphate, dioctyl phosphate, diisooctyl phosphate, and the like), and sulfates (such as dimethyl sulfate, diethyl sulfate, and the like). A usage amount of the terminator is 80-120% of a mole number of the catalyst used in the reaction.

A method in an embodiment of the present application can be performed without a solvent or with a solvent inert to isocyanates. The suitable solvent includes the common coating solvents such as: butyl acetate, ethyl acetate, tetrahydrofuran, propylene glycol methyl ether acetate, xylene, propylene glycol diacetate, butanone, methyl isoamyl ketone, cyclohexanone, hexane, toluene, xylene, benzene, chlorobenzene, o-dichlorobenzene, a hydrocarbon mixture, dichloromethane, and the like. However, the reaction in an embodiment of the present application is preferably performed without a solvent added.

After the reaction, a suitable separation method (such as one or a combination of at least two of a flash evaporator, a falling film evaporator, a thin film evaporator and a short path evaporator) may be used to remove the unreacted isocyanate monomer in the system. A suitable separation temperature is controlled to be 120-160° C. In the obtained polyisocyanate composition, a content of the unreacted isocyanate monomer is preferably less than or equal to 0.5% by weight, and more preferably less than or equal to 0.3% by weight.

The present application also relates to a related product, including a polyurethane coating, a polyurethane adhesive, etc., which is prepared from the polyisocyanate containing uretdione groups prepared by a method in an embodiment of the present application. Additionally, the polyisocyanates containing uretdione groups prepared by a method in an embodiment of the present application can be used to prepare other related products such as polyurethane coating and polyurethane adhesive after being blocked with a blocking agent.

Compared with the prior art, the present application has the following benefits:

The uretdione polyisocyanate tends to significantly increase the viscosity in the system during storage. In the present application, by controlling the ratio of the carbamate group/(the isocyanurate group+the uretdione group) in the system, the product is inhibited from viscosity increasing during storage, and improved in the storage stability.

Other aspects will become apparent upon reading and understanding the detailed description.

DETAILED DESCRIPTION

Although the method provided in the present application is further illustrated through embodiments hereinafter, the present application is not limited to the listed embodiments, and further comprises any other known variations within the scope of the claims of the present application. The specific application of the present application is not limited to the applications mentioned in the embodiments, and the simple variations can be made for the present application by those skilled in the art using conceptions in the present application without departing from the protection scope of the present application.

The following testing methods are used in embodiments of the present application.

(1) Determination of a GPC reaction conversion rate

The gel chromatography technology (LC-20AD/RID-10A, chromatographic column: MZ-Gel SDplus 10E3A 5 μm (8.0*300 mm), MZ-Gel SDplus 500A 5 μm (8.0*300 mm) and MZ-Gel SDplus 100A 5 μm (8.0*300 mm) connected in series, Shimadzu; mobile phase: tetrahydrofuran; flow rate: 1.0 mL/min; analysis time: 40 min, temperature of chromatographic column: 35° C.) was used to quantify the raw material of isocyanate, the area normalization method was used to determine the area of polymers and monomers in the system, and the GPC reaction conversion rate (%)=S (a monomer peak area)/S (a sum of each component peak area)*100%.

(2) An isocyanate group concentration (NCO group content) was determined according to the standard GB/T 12009.4.

(3) Viscosity determination method: A dynamic viscosity was determined at 25° C. using a BrookField DV-I Prime viscometer with an S21 rotor.

(4) Determination of a carbamate group/(a uretdione group+an isocyanurate group)

This molar ratio was denoted as Molar Ratio 1. The determination method adopted the $^{13}$C-NMR nuclear magnetic resonance method. The instrument used was a Bruker 400 MHz instrument, the sample concentration was 50% by weight (CDCl$_3$ solution), and the determination condition was 100 MHz.

The calculation method of the molar ratio was that: Molar Ratio 1=the signal area at around 156 ppm/(the signal area at around 149 ppm/3+the signal area at around 158 ppm/2).

(5) Determination of a carbamate group/(carbamate+allophanate):

This molar ratio was denoted as Molar Ratio 2. The determination method adopted the H-NMR nuclear magnetic resonance method, the instrument used was a Bruker 400 MHz instrument, the sample concentration was 5% by weight (CDCl$_3$ solution), and the determination condition was 400 MHz.

The calculation method of the molar ratio was that: Molar Ratio 2=the signal area at around 4.9 ppm/(the signal area at around 8.9 ppm+the signal area at around 4.9 ppm).

(6) Curing performance

The coating composition was coated on tinplate, placed for 15 min, baked at 80° C. for 60 min, and placed at room temperature for 15 min. The adhesion was tested by the hundred-cell method, and the lower the adhesion test value, the better the curing performance.

In the following examples, the information of the raw materials used is as follows:

hexamethylene diisocyanate: Wanhua Chemical, purity>99%;

2-ethyl-1,3-hexanediol: Aladdin reagent, purity>99%;

tri-n-octylphosphine: Sigma reagent, purity>95%;

diisooctyl phosphate: Aladdin reagent, purity>99%;

tri-n-butylphosphine: Aladdin reagent, purity>95%; and methyl p-toluenesulfonate: Aladdin reagent, purity>99%.

Other raw materials and reagents can be obtained through commercial channels unless otherwise specified.

Unless otherwise specified in the following examples and comparative examples, the reaction solution was kept under the protection of dry nitrogen before the reaction, during the catalyst addition and during the entire reaction process. All percentages are by mass unless otherwise specified.

Example 1

To hexamethylene diisocyanate (HDI) with a total mass M of 1000 g, 15 g of 2-ethyl-1,3-hexanediol was added under stirring at 50° C., and reacted for 1 hour to perform a carbamate-forming reaction. The reactor was controlled at a temperature of 60° C., and added with 2.5 g of tri-n-octylphosphine. The gel chromatography was used to quantitatively monitor the ratio of the consumed mass M1 of HDI to the total mass M of HDI added in the reaction system (i.e. the GPC reaction conversion rate). When the GPC reaction conversion rate was 30-65%, 2.2 g of diisooctyl phosphate was added to terminate the reaction. A distillation was performed to remove the unreacted HDI in the reaction system using a two-stage film evaporator at 140° C. and under 0.3 mbar, so as to obtain a polyisocyanate product containing uretdione groups. The indexes of each product prepared under different GPC reaction conversion rates are separately shown in Table 1.

TABLE 1

Various index parameters of the polyisocyanate compositions in Example 1

| | GPC reaction conversion rate/% | Isocyanate group concentration/% | Molar Ratio 1 | Molar Ratio 2 | Initial viscosity/cp (25° C.) | Viscosity after 6 months/cp | Homogeneity after 6 months |
|---|---|---|---|---|---|---|---|
| 1-a | 30 | 22.5 | 0.38 | 0.4 | 75 | 98 | turbid |
| 1-b | 40 | 22 | 0.25 | 0.3 | 95 | 120 | turbid |
| 1-c | 43 | 21.8 | 0.20 | 0.26 | 110 | 115 | normal |
| 1-d | 45 | 21.6 | 0.10 | 0.23 | 124 | 131 | normal |
| 1-e | 50 | 21.2 | 0.08 | 0.17 | 180 | 190 | normal |
| 1-f | 55 | 21 | 0.01 | 0.011 | 464 | 480 | normal |
| 1-g | 65 | 20.4 | 0.005 | 0.008 | 1145 | 4986 | normal |

Example 2

To hexamethylene diisocyanate (HDI) with a total mass M of 1000 g, 2.5 g of tri-n-octyl phosphine was added under stirring at 60° C., and the gel chromatography was used to quantitatively monitor the ratio of the consumed mass M1 of HDI to the total mass M of HDI added in the reaction system (i.e. the GPC reaction conversion rate). When the GPC reaction conversion rate was 50%, 2.2 g of diisooctyl phosphate was added to terminate the reaction. The system was heated to 80° C. and added with 15 g of 2-ethyl-1,3-hexanediol, and continued to react for 0.5-4 hours. Distillations were separately performed to remove the unreacted HDI in the reaction system using a two-stage film evaporator at 140° C. and under 0.3 mbar, so as to obtain polyisocyanate products containing uretdione groups. The indexes of each product prepared under different reaction time are separately shown in Table 2.

TABLE 2

Various index parameters of the polyisocyanate compositions in Example 2

| | Later-stage reaction time/h | Isocyanate group concentration/% | Molar Ratio 1 | Molar Ratio 2 | Initial viscosity/cp (25° C.) | Viscosity after 6 months/cp | Homogeneity after 6 months |
|---|---|---|---|---|---|---|---|
| 2-a | 0.5 | 22 | 0.20 | 0.5 | 160 | 173 | inhomogeneous |
| 2-b | 1 | 21.8 | 0.16 | 0.4 | 180 | 190 | normal |
| 2-c | 1.5 | 21.65 | 0.08 | 0.28 | 192 | 201 | normal |
| 2-d | 2 | 21.6 | 0.02 | 0.02 | 220 | 240 | normal |
| 2-e | 4 | 21.3 | 0.005 | 0.007 | 240 | 1529 | normal |

The curing performance of each polyisocyanate composition in Example 2 was tested, and the testing method was as follows: a hydroxy acrylic resin (Tongde AC1100B, solid content 60%, hydroxyl value 86 mg/g) was respectively mixed with the above polyisocyanate compositions containing uretdione groups at a molar ratio of NCO/OH=1:1, and diluted to 50% with a butyl acetate solven, and the coating film was evaluated. The performance test results are shown in the table below.

TABLE 3

Evaluation table of the coating film test in Example 2

| Product No. | Adhesion grade |
|---|---|
| 2-a | 3 |
| 2-b | 2 |
| 2-c | 2 |
| 2-d | 1 |
| 2-e | 1 |

Example 3

To 1000 g of hexamethylene diisocyanate (HDI), 5 g of 1,3-butanediol was added at 60° C. and reacted for 1 hour, and then 3 g of tri-n-butylphosphine was added as a catalyst, after a reaction time of 4 hours, under being quantitatively monitored using the gel chromatography, the ratio of the consumed mass M1 of HDI to the total mass M of HDI added in the reaction system was 55%. 2.8 g of methyl p-toluenesulfonate was added and heated for 1 hour to 80° C., and then the reaction was terminated. After termination, 5 g of 1,3-butanediol was added, and continued to react for 1 hour. A film distillation was performed at 140° C. and under 0.3 mbar, so as to obtain a polyisocyanate composition product 3-a containing uretdione groups, of which the indexes are shown in Table 4.

Comparative Example 1

This comparative example was performed with reference to the example 1 in the patent literature CN1334264A, of which the process was described below. To 1000 g of hexamethylene diisocyanate (HDI), 10 g of 1,3-butanediol and 3 g of tri-n-butylphosphine were added at 60° C. as catalysts. After a reaction time of 4 hours, under being quantitatively monitored using the gel chromatography, the ratio of the consumed mass M1 of HDI to the total mass M of HDI added in the reaction system was 55%. 2.8 g of methyl p-toluenesulfonate was added and heated for 1 hour to 80° C., and then the reaction was terminated. A film distillation was performed at 140° C. and under 0.3 mbar, so as to obtain a product D1 containing uretdione groups, of which the indexes are shown in Table 4.

Comparative Example 2

This comparative example was performed with reference to the technical solution in the patent literature DE-A 1670720, of which the specific method was described below. To 1000 g of hexamethylene diisocyanate (HDI), 3 g of tri-n-butylphosphine was added at 60° C. as a catalyst. After a reaction time of 4 hours, under being quantitatively monitored using the gel chromatography, the ratio of the consumed mass M1 of HDI to the total mass M of HDI added in the reaction system was 55%. 2.8 g of methyl p-toluenesulfonate was added and heated for 1 hour to 80° C., and then the reaction was terminated. A film distillation was performed at 140° C. and under 0.3 mbar, so as to obtain a product D2 containing uretdione groups, of which the indexes are shown in Table 4.

TABLE 4

Various index parameters of the polyisocyanate compositions in Example 3 and Comparative Examples 1 and 3

| | Isocyanate group concentration/% | Molar Ratio 1 | Molar Ratio 2 | Initial viscosity/cp (25° C.) | Viscosity after 6 months/cp | Homogeneity after 6 months |
|---|---|---|---|---|---|---|
| 3-a | 21.8 | 0.08 | 0.03 | 162 | 170 | normal |
| D1 | 21.8 | 0.005 | 0.02 | 168 | 573 | normal |
| D2 | 22 | / | / | 148 | 4528 | normal |

It can be seen from the performance test results of the above examples and comparative examples that:

In the products of low-viscosity system, when the absolute content of carbamate was relatively high in the system, that is, when Molar Ratio 1 was more than 0.2, although the viscosity of the low-viscosity system was inhibited from increasing, the system was prone to a turbidity condition during storage due to the poor compatibility of carbamate structure in the system, and for example, samples in 1-a and 1-b had such circumstance; although the sample in 2-a did not exhibit the significant turbidity condition, it had exhibited a condition of poor light transmittance and overall non-uniformity which could even be observed by naked eye, resulting from that Molar Ratio 1 was close to the critical value, and Molar Ratio 2 was more than 0.4.

When the absolute content of carbamate was relatively low, that is, when Molar Ratio 1 was less than 0.01, although Molar Ratio 2 satisfied the requirement, the absolute content of carbamate was low in the system, exhibiting a weak effect of inhibiting the viscosity of the low-viscosity system from increasing, and the viscosity of the system was still prone to increase, as shown in Comparative Example 1. And for Comparative Example 2, the reaction raw materials included no alcohol compound, and the product included no carbamate structure absolutely, and the increase trend of viscosity was more significant in the system.

What is claimed is:
1. A storage-stable polyisocyanate composition, which is obtained by reacting one or more diisocyanates selected from aliphatic diisocyanates and alicyclic diisocyanates, with an alcohol compound, and the polyisocyanate composition comprises an isocyanurate group, a uretdione group, a carbamate group and an allophanate group;
in the polyisocyanate composition, a molar ratio of the carbamate group/(the uretdione group+the isocyanu- rate group) is 0.08-0.2, and a molar ratio of the carbamate group/(the allophanate group+the carbamate group) is 0.17-0.4.

2. The storage-stable polyisocyanate composition according to claim 1, wherein an isocyanate group concentration is 16-24% by weight.

3. The storage-stable polyisocyanate composition according to claim 1, wherein an isocyanate group concentration is 20-23% by weight.

4. The storage-stable polyisocyanate composition according to claim 3, wherein a viscosity of the polyisocyanate composition at 25° C. is 100-1500 cp.

5. The storage-stable polyisocyanate composition according to claim 1, wherein the alcohol compound has a relative molecular weight of 32-200, wherein the alcohol compound is one or more of methanol, ethanol, n-propanol, isopropanol, n-butanol, n-hexanol, 2-ethyl-1-hexanol, 1-methoxy-2-propanol, ethylene glycol, propylene glycol, isomeric butanediol, hexylene glycols, caprylyl glycols, diethylene glycol, dipropylene glycol, 2-ethyl-1,3-hexanediol, 2,2,4-trimethylpentanediol, glycerol and trimethylolpropane.

6. The storage-stable polyisocyanate composition according to claim 1, wherein the aliphatic diisocyanate and the alicyclic diisocyanate are an organic diisocyanate containing 4-20 carbon atoms in the carbon skeleton in addition to the NCO group.

7. The storage-stable polyisocyanate composition according to claim 6, wherein the organic diisocyanate is one or more of hexamethylene diisocyanate, isophorone diisocyanate, cyclohexyl dimethylene diisocyanate, dicyclohexylmethane diisocyanate, norbornane dimethylene diisocyanate, cyclohexyl diisocyanate and 2,4,4-trimethylhexamethylene diisocyanate.

8. The storage-stable polyisocyanate composition according to claim 1, wherein after the polyisocyanate composition has been stored at less than or equal to 40° C. for 6 months, the product viscosity changes less than or equal to 10%.

9. A preparation method of the storage-stable polyisocyanate composition according to claim 1, comprising: mixing and reacting the diisocyanate and the alcohol compound, and controlling a reaction temperature to be 50-160° C.; controlling a reaction time to be 0.5-4 hours; then adding a tertiary phosphine catalyst, and controlling a reaction temperature to be 60-120°° C. and a reaction time to be 1-12 hours;

or, mixing and reacting the diisocyanate and a tertiary phosphine catalyst, and controlling a reaction temperature to be 50-150° C.; controlling a reaction time to be 0.5-12 hours; then adding the alcohol compound, and controlling a reaction temperature to be 60-120° C. and a reaction time to be 1-3 hours.

10. The preparation method of the storage-stable polyisocyanate composition according to claim 9, wherein the tertiary phosphine catalyst has the following structural formula:

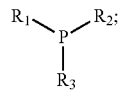

wherein $R_1$, $R_2$ and $R_3$ are independently selected from an aliphatic substituent or an aromatic substituent.

11. The preparation method of the storage-stable polyisocyanate composition according to claim 9, wherein when the diisocyanate and the alcohol compound are mixed and reacted, the reaction temperature is controlled to be 50-150° C.

12. The preparation method of the storage-stable polyisocyanate composition according to claim 9, wherein when the diisocyanate and the alcohol compound are mixed and reacted, the reaction time is controlled to be 1 hour.

13. The preparation method of the storage-stable polyisocyanate composition according to claim 9, wherein when the diisocyanate and the tertiary phosphine catalyst are mixed and reacted, the reaction temperature is controlled to be 50-80° C.

14. The storage-stable polyisocyanate composition according to claim 2, wherein a viscosity of the polyisocyanate composition at 25° C. is 130-1000 cp.

15. The preparation method of the storage-stable polyisocyanate composition according to claim 12, wherein after adding the tertiary phosphine catalyst, the reaction temperature is controlled to be 60-100° C.

16. The preparation method of the storage-stable polyisocyanate composition according to claim 9, wherein after adding the tertiary phosphine catalyst, the reaction time is controlled to be 1-8 hours.

17. The preparation method of the storage-stable polyisocyanate composition according to claim 13, wherein when the diisocyanate and the tertiary phosphine catalyst are mixed and reacted, the reaction time is controlled to be 1-10 hours.

18. The preparation method of the storage-stable polyisocyanate composition according to claim 13, wherein after adding the alcohol compound, the reaction temperature is controlled to be 80-100° C.

19. The preparation method of the storage-stable polyisocyanate composition according to claim 13, wherein after adding the alcohol compound, the reaction time is controlled to be 1-2 hours.

* * * * *